United States Patent
Klemp et al.

(10) Patent No.: US 10,645,708 B2
(45) Date of Patent: May 5, 2020

(54) METHOD AND DEVICE FOR SELECTING TRANSMISSION CHANNELS IN A NETWORK RADIO CONNECTION

(71) Applicant: Bayerische Motoren Werke Aktiengesellschaft, Munich (DE)

(72) Inventors: Oliver Klemp, Munich (DE); Adrian Posselt, Munich (DE); Levent-Yusuf Ekiz, Munich (DE); Christian Lottermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 88 days.

(21) Appl. No.: 14/865,560

(22) Filed: Sep. 25, 2015

(65) Prior Publication Data
US 2016/0014793 A1   Jan. 14, 2016

Related U.S. Application Data

(63) Continuation of application No. PCT/EP2014/055689, filed on Mar. 21, 2014.

(30) Foreign Application Priority Data

Mar. 26, 2013 (DE) .......................... 10 2013 205 349
Aug. 9, 2013 (DE) .......................... 10 2013 215 728
Aug. 9, 2013 (DE) .......................... 10 2013 215 729

(51) Int. Cl.
*H04W 72/08*   (2009.01)
*H04W 76/16*   (2018.01)
(Continued)

(52) U.S. Cl.
CPC ........ *H04W 72/085* (2013.01); *H04B 1/3822* (2013.01); *H04B 7/0617* (2013.01);
(Continued)

(58) Field of Classification Search
CPC ... H04W 72/085; H04W 48/18; H04W 72/06; H04W 76/026; H04B 1/3822; H04B 7/0617; H04B 7/0695
See application file for complete search history.

(56) References Cited

U.S. PATENT DOCUMENTS 8,036,098 B2   10/2011  Pereira et al.
8,400,974 B2    3/2013  Mueck et al.
(Continued)

FOREIGN PATENT DOCUMENTS

JP   2006-135881 A   5/2006
JP   2009-147956 A   7/2009
JP   2012-524497 A   10/2012

OTHER PUBLICATIONS

Japanese Office Action issued in Japanese counterpart application No. 2016-504590 dated Sep. 27, 2017 (Four (4) pages).
(Continued)

*Primary Examiner* — Jeffrey M Rutkowski
*Assistant Examiner* — Basil Ma
(74) *Attorney, Agent, or Firm* — Crowell & Moring LLP

(57) ABSTRACT

Transmission channels are selected in a multiantenna network radio connection in which data are transmitted using radio signals between a radio base station and a mobile terminal. The mobile terminal has at least one decoder, by means of which radio signals received by at least one of the terminal antennas can be decoded in order to obtain the data. By means of the transmission channel selection, it is decided which transmission path and/or which communication technology is to be used for the transmission of the data between the radio base station and the mobile terminal.

25 Claims, 7 Drawing Sheets

(51) Int. Cl.
*H04B 7/08* (2006.01)
*H04B 7/06* (2006.01)
*H04W 48/18* (2009.01)
*H04W 72/06* (2009.01)
*H04B 1/3822* (2015.01)
*H04W 36/24* (2009.01)
*H04W 88/06* (2009.01)
*H04W 84/12* (2009.01)

(52) U.S. Cl.
CPC .......... *H04B 7/0695* (2013.01); *H04B 7/086* (2013.01); *H04B 7/088* (2013.01); *H04W 48/18* (2013.01); *H04W 72/06* (2013.01); *H04W 76/16* (2018.02); *H04W 36/245* (2013.01); *H04W 84/12* (2013.01); *H04W 88/06* (2013.01)

(56) References Cited

U.S. PATENT DOCUMENTS

| | | | |
|---|---|---|---|
| 2008/0242251 A1 | 10/2008 | Kraemer et al. | |
| 2009/0059861 A1 | 3/2009 | Gunnarsson et al. | |
| 2010/0234071 A1* | 9/2010 | Shabtay | H04B 7/0408 455/562.1 |
| 2011/0267969 A1 | 11/2011 | Ceccherini et al. | |
| 2012/0064908 A1 | 3/2012 | Fox et al. | |
| 2012/0220238 A1* | 8/2012 | Hosoya | H04B 7/0695 455/63.4 |
| 2013/0023281 A1* | 1/2013 | Meredith | H04W 36/245 455/456.1 |
| 2013/0072189 A1* | 3/2013 | Cheng | H04W 36/0083 455/436 |
| 2013/0721189 | 3/2013 | Cheng et al. | |
| 2013/0208619 A1* | 8/2013 | Kudo | H04B 7/0452 370/252 |
| 2013/0336242 A1* | 12/2013 | Rajagopal | H04W 72/0453 370/329 |
| 2014/0226506 A1* | 8/2014 | Sadek | H04J 3/1694 370/252 |
| 2015/0071137 A1* | 3/2015 | Thiam | H01Q 9/0407 370/297 |

OTHER PUBLICATIONS

Wataru Yamada, "Indoor 2×2MIMO-OFDM Propagation Character" URSI Commission F Japanese Committee, Sep. 10, 2004, URL:http://ursi-f.nict.go.jp/doc/URSI_F_2004Sep10_yamada.pdf, 8 total pages.
PCT/EP2014/055689, International Search Report dated Aug. 29, 2014 (Three (3) pages).
German Search Report issued in counterpart German Application No. DE 10 2013 215 728.2 dated Oct. 14, 2013 (Four (4) pages).
German Search Report issued in counterpart German Application No. DE 10 2013 215 729.0 dated Oct. 14, 2013 (Four (4) pages).

* cited by examiner

METHOD AND DEVICE FOR SELECTING TRANSMISSION CHANNELS IN A NETWORK RADIO CONNECTION

CROSS REFERENCE TO RELATED APPLICATIONS

This application is a continuation of PCT International Application No. PCT/EP2014/055689, filed Mar. 21, 2014, which claims priority under 35 U.S.C. § 119 from German Patent Application No. 10 2013 205 349.5, filed Mar. 26, 2013, German Patent Application No. 10 2013 215 728.2, filed Aug. 9, 2013, and German Patent Application No. 10 2013 215 729.0, filed Aug. 9, 2013, the entire disclosures of which are herein expressly incorporated by reference.

BACKGROUND AND SUMMARY OF THE INVENTION

The invention relates to a method and an apparatus for selecting a transmission channel in a network radio link. The invention relates particularly to the selection of a transmission channel or of a connecting network in a wireless communication network on the basis of a multiantenna transmission method in which radio signals are transmitted between at least one radio base station and a mobile terminal, which have at least two antennas. The invention additionally relates particularly to the selection of a radio transmission channel from a plurality of radio channels that each have different transmission technologies.

Selection of the transmission channel or of the connecting network in a mobile radio network involves regularly deciding on the static base station with which a mobile radio, for example a cellphone, communicates for data transmission. By way of example, a change of transmission channel can become necessary when the mobile radio is in an area in which signals from two base stations can be received. In particular, this is necessary, by way of example, when the mobile radio moves from the transmission/reception area, i.e. mobile radio cell, of the first base station into the transmission/reception area of the second base station, for example on a car journey. The change in the communication of the mobile radio from the transmission channel with the first base station to the transmission channel with the second base station is also called a handover process.

US 2009/0059861 A1 describes various methods for controlling a handover process in a cell-based transmission system with a change between two transmission frequencies. In a first method, the signal strength on the respective transmission frequency is ascertained on the mobile radio and the connection is set up using that frequency that has the higher signal strength. In a second method, the signal quality of the respective transmission frequency is ascertained on the mobile radio and the connection is set up using the transmission frequency with the better signal quality.

US 2011/0267969 A1 likewise describes a handover process between mobile radio cells, in which a series of received signal parameters are used for controlling the process, such as signal strength and signal-to-noise ratio.

Mobile terminals such as cellphones, smartphones, tablet PCs or laptops are additionally increasingly able to communicate, in particular wirelessly, using different communication systems, in particular wirelessly using radio channels of different transmission technologies. To this end, they are linked to appropriate electronic communication-system-specific components or technologies and, to this end, have electronic components corresponding to the respective technology. By way of example, one first such communication system technology is a mobile radio technology for data transmission on the basis of corresponding mobile radio standards, such as Global System for Mobile Communications (GSM), Universal Mobile Telecommunications Systems (UMTS) or Long Term Evolution (LTE). A further wireless transmission technology is a technology for operating a computer network, particularly for a wireless local area network (WLAN) based on the IEEE 802.11x standard. By way of example, a further wireless transmission technology for mobile terminals is Bluetooth technology based on the technological standard IEEE 802.15.1. Different transmission technologies can have different transmission frequencies, for example. To control the respective data transmission, a respective appropriate, standardized transmission protocol is provided for the transmission technologies, with different versions of the standard being able to be provided in each case, such as GSM 2G/3G or IEEE 802.11a/b/n, which each have different details for the respective implementations.

Selection of the transmission channel or of the connecting network in a mobile radio network involves regularly deciding on the static base station with which a mobile radio, for example a cellphone, communicates for data transmission. By way of example, a change of transmission channel can become necessary when the mobile radio is in an area in which signals from two base stations can be received. In particular, this is necessary, by way of example, when the mobile radio moves from the transmission/reception area, i.e. mobile radio cell, of the first base station into the transmission/reception area of the second base station, for example on a car journey. The change in the communication of the mobile radio from the transmission channel with the first base station to the transmission channel with the second base station and/or between mobile radio networks or transmission channels is also called a horizontal handover process.

In what are known as hybrid communication networks, a wireless data link can be provided using radio channels of different transmission technologies and/or using different connection infrastructure components.

In hybrid communication networks, it is sometimes advantageous or even necessary to change over the wireless data link between terminals, base stations, switching centers and/or central data sources between radio channels of different transmission technologies selectively and/or in parallel, entirely or partly and permanently or temporarily. In order to be able to control such, what are known as vertical, handover processes automatically and to make the associated decisions in hybrid communication networks advantageously, suitable decision criteria or algorithms are needed. In hybrid communication networks, it is sometimes also advantageous or even necessary to change over the wireless data link between terminals, base stations, switching centers and/or central data sources between radio channels with a different connection infrastructure in the same transmission technology, for example between infrastructure components of different mobile radio providers or between base stations of different mobile radio cells, selectively and/or in parallel, entirely or partly and permanently or temporarily. In order to be able to control such horizontal handover processes automatically and to make the associated decisions in hybrid communication networks advantageously, suitable decision criteria or algorithms are likewise needed.

The ever more widespread, parallel availability of static or mobile network elements of different connection technologies, such as WLAN elements, for example on the basis of the IEEE 802.11x or ETSI ITS G5 standard, or mobile radio networks, using multiantenna radio, such as on the basis of the 3GPP LTE standard, results in ever more networking options for connecting the mobile terminal to a central device (what is known as a backend).

It is a first possible object of the invention, for communication systems that have a multiantenna network radio link that can be used transmit data by means of radio signals between at least one radio base station and a mobile terminal, which each have at least two antennas, to allow the transmission channel to be selected such that a high connection quality is achieved.

It is a second possible object of the invention, in a communication network that allows a wireless data link using radio channels of different transmission technologies and/or different infrastructure components, to achieve a high connection quality.

At least one of these objects is respectively achieved by the invention specified in the independent patent claims. Advantageous embodiments of the invention are respectively specified in the dependent claims.

According to a first aspect of the invention, transmission channel selection in a network radio link in which data are transmitted by means of radio signals between a radio base station and a mobile terminal has provision for the radio base station and the mobile terminal to each have at least two antennas that form a plurality of transmission paths for the radio link and at least two transmission channels for the data transmission, which each use one or more of the transmission paths in accordance with a channel matrix, the mobile terminal to have at least one decoder that can be used to decode radio signals received from at least one of the terminal antennas to obtain the data, and the transmission channel selection to be used to decide which instance(s) of the transmission paths and/or which communication system technology is/are used to transmit the data between radio base station and mobile terminal.

In this case, there is provision for the following steps:

the mobile radio base station uses the transmission paths to transmit mobile radio signals for first data to the mobile terminal using at least one communication system technology, the mobile radio signals are supplied to the decoder on a transmission-channel-by-transmission-channel basis, the decoder decodes the mobile radio signals and in so doing obtains the first data on a transmission-channel-by-transmission-channel basis, the decoded first data are used on a transmission-channel-by-transmission-channel basis to form at least one quality value that is representative of a quality of the data transmission via the respective transmission channel, and a comparison of the quality values of the transmission channels is used to perform the transmission channel selection for the subsequent transmission of second data that form useful data.

The first aspect of the invention is based on the insight that, for optimum selection of the respective transmission channel, it is more beneficial to determine channel-specific quality values than just signal-specific values such as power level or signal-to-noise ratio. The invention is also based on the insight that the transmission channel selection on the basis of channel-specific quality values is particularly advantageous when the mobile terminal has at least two antennas.

In this case, the physical proximity of the reception antennas means that the signal-specific values frequently differ less than channel-specific quality values, which are also dependent on other factors, such as the communication system technology used on the respective channel.

This aspect of the invention has additionally been used to identify that transmission channel selection on the basis of the quality value allows more efficient utilization of radio resources than when the transmission channel selection is made on the basis of power-oriented threshold value decisions, because the powers are frequently dependent on spatial influences such as reflection, diffraction and/or scatter of the electromagnetic waves. The approach according to the invention can have an effect at the terminal in the form of increased functional quality and at the network operator by virtue of improved use of the available spectral efficiency, i.e. a greater transmittable volume of information per time and per hertz of bandwidth. In addition, the invention can advantageously be used to increase the robustness of the radio link and to increase the transmission capacity and the range between infrastructure and mobile terminal. The terminal can furthermore advantageously reduce the power draw required and hence possibly increase the operating time of the storage battery.

In an advantageous exemplary embodiment of the first aspect of the invention, at least one antenna of the radio base station and one antenna of the mobile terminal are set up to transmit data on the basis of at least two different communication system technologies. One or more of the antennas can be used for two communication system technologies, e.g. for the GSM and LTE technologies, simultaneously or in parallel. The mobile terminal can particularly have at least two antennas for different communication system technologies.

The quality value can be formed on the basis of physical properties of the transmission path and/or of the channel and particularly from weighted channel parameters. To this end, there are a multiplicity of suitable physical variables, of which, merely by way of example, the absolute data transmission rate attained via the path or channel, a condition number—ascertained on the basis of the channel matrix—of the transmission channel and/or the spectral efficiency of the path or channel may be cited here.

For the decision about which transmission channel is used, a transmission matrix having associated channel parameters can be formed for a plurality of available transmission channels, particularly for preselected channels or for all channels available in the radio link. The transmission or channel matrix can comprise complex channel weights between all combinations of transmission and reception antennas in a multiantenna transmission system. In a 2×2 transmission system having two transmission antennas and two reception antennas, a total of four complex transmission parameters then need to be evaluated, for example.

The invention particularly allows vertical handover decisions in hybrid communication networks to be made advantageously, these involving deciding which radio transmission standard connected to the transmission channel and/or which communication system technology is/are used to transmit useful data between mobile radio base station and mobile terminal. The ever more widespread, parallel availability of static or mobile network elements of different connection technologies, such as WLAN elements, for example on the basis of the IEEE 802.11x or ETSI ITS G5 standard, or mobile radio networks having multiantenna radios, such as on the basis of the 3GPP LTE standard, results in ever more networking options for connecting the mobile terminal to a central device (what is known as a backend). According to the invention, it has been identified that better transmission properties can be achieved for such radio networks by virtue of physical channel properties instead of purely power-based channel parameters being taken into account for the selection of the transmission channel, including the associated communication system technology and/or the associated radio transmission standard, i.e. for a vertical handover decision.

Determining the quality value can involve channel parameters of the transmission matrix being ascertained. In an advantageous exemplary embodiment of the invention, determining the quality value can involve channel estimation being performed. To this end, by way of example, channel parameters of the transmission matrix can be estimated on the terminal at the output of the decoder that decodes the respective radio signals. By way of example, channel parameters are estimated on the basis of analysis values from a communication modem that has a finite bandwidth with a finite measuring time and a finite resolution. By way of example, the channel estimation can comprise integration, in particular short-term integration, over a prescribed, limited reception bandwidth and a finite measuring time, for example over at least a portion of a preamble, i.e. over a known bit sequence of a transmission protocol used for the radio link, and/or other parameters of the respective network, particularly on the physical network level (PHY) thereof in the OSI (Open Systems Interconnection Model) layer model. In particular, the quality value can be used in order to be able to take account of channel influences on the data transmission for the demodulation of the received radio signals during channel selection. To this end, the channel estimation can be performed, in particular regularly, according to prescribed rules, for example at regular intervals of time. On the basis of this channel information, extended rating of the radio network quality is possible, with purely passive rating of the transmission parameters being able to be performed by the mobile terminal. This means that no additional system bandwidth is necessary.

The improved assessment that the invention allows for the radio network quality or quality of the transmission channel can advantageously be used for vertical handover decisions when the connection technology is changed between radio base station or infrastructure and mobile terminal. This results in a higher data transmission rate and in greater robustness of the data transmission. The improved assessment of the radio network quality or transmission channel quality can additionally be used for deriving horizontal handover decisions, that is to say for changing between two networks of the same connection technology, that is to say when changing between overlapping or adjoining mobile radio cells of the same mobile radio standard, such as GSM, or between two WLAN networks, for example. The invention therefore allows advantageous dual use of the available information about the quality of the respective transmission channel or radio network.

The first aspect of the invention allows the following further advantages to be achieved:

The transmission capacity can be increased despite a comparatively low reception power level on the mobile terminal.

Increased robustness of the radio link for provision of the same functional quality for comparatively low reception power levels on the mobile terminal.

Increased range of the radio system for constant functional quality.

Compensation for transmission imbalances owing to different antenna locations or different antenna efficiencies, for example, through evaluation of the information from the entire channel matrix.

According to a second aspect of the invention, which can be implemented in combination with the first aspect of the invention or else independently thereof, a radio transmission channel is selected from a group of radio transmission channels, which each correspond to different transmission technologies and/or use different infrastructure components, in order to set up a data link between a mobile unit and a central unit. In this case, the central unit can be connected, and in particular is connected, to a first local unit that is arranged in a regional area and that can be used to set up a data transmission link to the mobile unit by means of a first radio transmission channel that corresponds to a first transmission technology from the different transmission technologies and/or uses a first infrastructure component. In addition, the central unit can be connected, and in particular is connected, to a second local unit that is arranged in a regional area and that can be used to set up a connection to the mobile unit by means of a second radio transmission channel that corresponds to a second transmission technology from the different transmission technologies and/or uses a second infrastructure component. The mobile unit has at least two radio units that are each designed for data transmission using one of the two radio transmission channels. The radio transmission channel is selected from the group of radio transmission channels by means of control data that are produced and/or stored outside the mobile unit. They can be transmitted particularly from an external data source to the mobile unit in order to control the selection. Following the selection, the data connection can be set up between the mobile unit and the central unit using the selected radio transmission channel.

The radio transmission channel is selected particularly in a communication network in which the data link is set up. The selection can be made in the mobile unit and particularly when the mobile unit is in the regional area or moves toward this area, in which a connection both to the first local unit and to the second local unit can be set up by means of its at least two radio units. The selection can be made particularly in the course of the change from a first regional area to a second regional area, with the radio transmission channel being able to be changed or changed over in the mobile unit depending on the selection. On the basis of the selection, a horizontal and/or vertical handover process can be performed for the radio transmission channel. To this end, the radio units may each be of corresponding design, for example by virtue of a transmission and/or reception unit that corresponds to a respective radio transmission technology and/or by virtue of an electronic and/or program-oriented component that can be used to provide coupling to an infrastructure component of the communication network, for example a SIM mobile radio card.

The selection of the radio transmission channel from the group of radio transmission channels can be made entirely or partly automatically. By way of example, it can be controlled entirely or partly by a computer program that is executed by means of a processor provided inside the mobile unit. The selection can also be controlled by suitable other electronic and, in particular, digital control components.

In an advantageous exemplary embodiment of the second aspect of the invention, the control data are produced, provided and/or transmitted to the mobile unit by the central unit and/or at least one of the local units. The radio transmission channel can be selected in the mobile unit, in particular. Selection of the radio transmission channel can involve the interaction of a controller provided in the mobile unit, a controller provided in the central unit and/or a controller provided in one of the local units. The mobile unit may be a vehicle, in particular.

According to a third aspect of the invention, which can be implemented alone or in combination with at least one of the other two aspects of the invention, a radio transmission channel is selected from a group of radio transmission channels, which each correspond to different transmission technologies and/or use different infrastructure components, in order to set up a data link between a mobile unit and a central unit. In this case, the central unit can be connected, and in particular is connected, to a first local unit that is arranged in a regional area and that can be used to set up a data transmission link to the mobile unit by means of a first radio transmission channel that corresponds to a first transmission technology from the different transmission technologies and/or uses a first infrastructure component. In addition, the central unit can be connected, and in particular is connected, to a second local unit that is arranged in the regional area and that can be used to set up a connection to the mobile unit by means of a second radio transmission channel that corresponds to a second transmission technology from the different transmission technologies and/or uses a second infrastructure component. The mobile unit has at least two radio units that are each designed for data transmission using one of the two radio transmission channels. The selection of the radio transmission channel from the group of radio transmission channels involves the use of data pertaining to at least one earlier radio link, what are known as historical data, for at least one of the radio transmission channels in the regional area. The data link can then be setup between the mobile unit and the central unit using the selected radio transmission channel.

In particular, the historical data can be obtained empirically and/or can be data provided with time stamps and/or stored. In particular, the historical data can be captured, provided and/or stored in the mobile unit, in at least one of the local units, in the central unit and/or in a further data source, for example in a backend server that can be connected to the communication network, and in particular may be invariably available therein. In particular, the historical data can be interchanged between one or more of these units. The mobile unit is mobile and moves particularly in the regional area.

By way of example, the infrastructure component may be a mobile radio base station, a central unit of a network operator or a control component of the respective communication network, particularly of the mobile radio network of the network operator. The infrastructure component may also be an appropriate component for a radio transmission channel of a different transmission technology, for example an access point for a WLAN network.

The third aspect of the invention is based on the insight that the selection process for a radio transmission channel in a regional area can be controlled much more simply and accurately if what are known as external control data, which are produced and/or stored outside the mobile unit, are available and used for at least one of the radio transmission channels in the regional area. The selection decision can then be made on the basis of a broader information base, particularly when both external control data and internal data produced or available inside the mobile unit, for example sensor data pertaining to the reception strength of the radio transmission channel, are used. This can result in a series of advantages, particularly for selection decisions for vertical and/or horizontal handovers in hybrid networks:

High connection quality, particularly when both internal and external data are available and are used. The connection quality can have the effect of fail-safety for the radio link, fast connection setup and/or inexpensive connection, for example.

High reception strength, particularly when external data pertaining to the reception strength of a plurality of radio transmission channels are used for controlling the channel selection.

No or fewer connection interruptions and relatively few vertical handover events and therefore more robust communication. This is of great importance particularly when the mobile unit is moved, for example as a smart phone with a vehicle and particularly in the form of a vehicle, for example when a mobile radio card is permanently integrated in the vehicle.

Short connection time (what is known as air time) between the mobile unit and the local unit. This allows more efficient use of the radio transmission channel, avoidance of unnecessary protocol overhead for the communication thereof and optimization of resources of the radio interface.

In particular, provision may be made for at least one of the units, preferably the mobile unit, to contain at least one sensor that is used to capture measured values from the respective radio transmission channel that are definitive for the quality of the radio transmission, said measured values likewise being used for selecting the radio transmission channel. By way of example, the sensor(s) can be used to capture the following measured variables:

Passively measurable network parameters such as performance characteristics, reception strength, signal-to-noise ratio, channel load, interference behavior, etc.

Actively measurable network parameters such as latency, packet error rate or maximum or average data transmission rate.

In particular, the sensor may be integrated in the mobile radio modem or the mobile radio modem itself may be the sensor.

Further local measured variables that are, in particular, not network-specific or not specific to the radio transmission channel and/or are recorded by vehicle sensors can be captured, particularly in the mobile unit, and used for the selection, for example by means of position, direction, speed and acceleration sensors, rotation rate sensors, direction sensors, imaging sensors, weather sensors, particularly precipitation sensors, etc.

According to an advantageous exemplary embodiment of the invention, the historical data and/or the external control data are geodata-referenced and the radio transmission channel is selected on the basis of position finding for the mobile unit and the geodata-referenced historical data. In this case, it is furthermore advantageously possible for position finding for the mobile unit to be performed by means of a navigation system and for a route that is stored in the navigation system and along which the mobile unit moves and the geodata-referenced historical data to be used for preconditioning the respective selection process for the radio transmission channel for road sections along the route. The historical data may also be time-referenced and the selection can be made on the basis of timing and the time-referenced historical data.

Criteria for the selection of the radio transmission channel or associated data transmission network can be determined both locally in the mobile unit on the basis of values ascertained by measurement and/or scanned and cooperatively. In the case of cooperative determination, data about radio transmission channels can also be received and used from other data sources, such as the local units or from a central data service, particularly from the central unit. Historical data and/or up-to-date data pertaining to the respective data transmission networks and/or technologies can be provided as what is known as an availability map, which comprises a plurality of local areas, is time-referenced and/or is created by the mobile unit or an external data source of the network provider or other service provider. In addition, it is particularly possible for a network operator to provide a network utilization map that shows the present utilization of the respective network or of the respective radio transmission technology. On the basis of the availability map and/or the network utilization map, a know-how map can be created that comprises additional data, empirical values and/or ratings and, in particular, historical data. The relevant historical data are each based on a multiplicity of data ascertained empirically and particularly by measurement, for example pertaining to network availability, pertaining to the availability of the respective transmission technology and/or pertaining to the respective signal strength. Data from the availability map, the network utilization map and/or the know-how map can be used to select the radio transmission channel and/or a network infrastructure component. By way of example, the position sensors may be geodata-referencing sensors based on the global positioning system (GPS).

The mobile unit or the mobile terminal may particularly be a vehicle. A vehicle within the meaning of the present invention can be any type of vehicle, for example a bicycle, a motor vehicle, an electric vehicle, a train, a ship, etc. The mobile unit may also be a mobile radio, such as a smartphone, or another unit that comprises at least one electronic communication module.

Said measured variables can be used advantageously particularly when the mobile unit is a vehicle or is used in the course of movement in a vehicle. In this case, local vehicle parameters can be captured as measured variables and used for selecting the radio transmission channel.

The use of up-to-date measured variables from the vehicle sensors and/or of corresponding up-to-date data from other sources for selecting the radio transmission channel allows improved preconditioning, particularly for vertical and/or horizontal handover decisions, for weather influences, such as snowfall or heavy rain, or for high road traffic volumes. Such preconditioning allows, in particular, vertical and/or horizontal handover decisions that are made for a moving mobile unit in the course of a transfer between two mobile radio cells to be improved.

According to a further advantageous exemplary embodiment of the invention, selection of the radio transmission channel involves the interaction of a controller provided in the mobile unit, a controller provided in the central unit and/or a controller provided in one of the local units.

The historical data and/or the external control data can be stored, in particular entirely or partly, in one of the controllers. They can be transmitted from this controller to another controller in the course of the selection process for the radio transmission channel.

The mobile unit can preferably contain a first control component for controlling the radio link of the first radio technology and/or for using the first infrastructure component, and a second control component for controlling the radio link for the second radio technology and/or for using the second infrastructure component. The two control components can interact for selecting the radio transmission channel for control purposes. The historical data are stored particularly in the mobile unit. These stored data are used particularly for selecting the radio transmission channel.

According to a further preferred embodiment of the invention, the radio transmission channel is additionally selected on the basis of at least one computer-controlled application that is executed on a processor that is connected to the mobile unit for control purposes and is particularly integrated in the mobile unit. By way of example, this embodiment can be used particularly advantageously when the mobile unit is a vehicle. Depending on the type of the at least one application, it is then possible for at least one of the radio transmission channels to be preferred in the selection. This allows optimization of the respective connection technology and/or infrastructure components for the respective application and hence optimization of the quality of the respective service provided by the application. By way of example, provision may be made for a radio transmission channel that can be used to transmit a high data rate, e.g. a WLAN channel, to be preferred for an entertainment application, while a radio channel with the highest possible signal strength, e.g. a GSM channel, is preferred for a safety-relevant application, for example, such as an emergency function. For the degree of preference, a parameter may be provided in corresponding decision algorithms for selecting the radio transmission channel, for example. The respective applications can also be categorized for the selection in respect of a priority. To this end, the emergency function and functions of driver assistance systems that are used to transmit traffic-flow-relevant data such as queue end data or cross traffic data can be ranked with a high priority, for example, while internet and multimedia functions are ranked with a medium priority and information services with low priority.

The application-oriented optimization for the selection of the radio transmission channel can be performed on the basis of locally captured and stored data within the mobile unit and/or on the basis of data that are provided by the central unit and/or transmitted to the mobile unit. In this case, the data can comprise historical data and/or further control data. By way of example, the decision parameters or optimization aims used for selecting the radio transmission channel can be the maximum data rate, a minimum transmission time, minimum transmission costs or maximum robustness of the respective data service.

The invention advantageously also allows the utilization or scaling of the various radio transmission channels to be optimized for a regional area, for example if the historical data reveal that a particular radio transmission channel is overloaded on a daily basis at a particular time, such as during "rush hour" in commuter traffic in the regional area, owing to the multiplicity of parallel users, and another radio transmission channel has only low utilization. In this situation, the historical data can be used to specifically select the radio transmission channel with little utilization, i.e. load balancing between the various radio transmission channels, such as a GSM mobile radio transmission channel and a WLAN radio transmission channel, can be performed in the regional area. This allows an increase in the spectral efficiency of the radio transmission channels in this area. Up-to-date data pertaining to rush hours or pertaining to traffic congestion or queues caused in some other way can also be provided in up-to-date fashion via the central unit and/or external data sources and used for selecting the radio link channel. To provide appropriate data, it is also possible to use what are known as crowd sourcing methods, where data are transmitted from a multiplicity of vehicles that are, or were recently, in the same regional area via a central data source, such as what is known as a backend server, or also directly from vehicle to vehicle, to the respective mobile unit in which the selection of the radio transmission channel is intended to be made.

Control data and/or historical data can also be transmitted directly from a first vehicle, which is particularly leaving the regional area, to a second vehicle, which is particularly entering the regional area, for example wirelessly in the form of a vehicle-to-vehicle (car-to-car) communication. These highly up-to-date data can then be used by the second vehicle for selecting the radio transmission channel.

When a radio transmission channel is used to perform a multiplicity of data transmissions in parallel, it is additionally advantageous to provide a central controller that takes account of the respective data-transmitting applications. This controller may be provided entirely or partly in the mobile unit, in the local unit and/or in the central unit. In this case, it is advantageous if measured variables ascertained locally with the mobile unit or the local unit are made available to the respective other units via suitable interfaces, for example via one or more of the radio transmission channels.

In cases in which the mobile unit is a vehicle, the invention can also be used particularly advantageously by virtue of said mobile unit also being able to be connected to a backend server by the radio transmission channels and the central unit and in turn being able to be connected to a multiplicity of other vehicles via this server for data purposes. It can therefore capture and store a multiplicity of historical data that are transmitted to it by the respective vehicles from the respective regional areas, for example pertaining to the radio transmission channels there. In this case, the transmitted data may be georeferenced, in particular, or can be georeferenced in the course of storage in the backend server.

For the selection of the radio transmission channel, it is possible to implement different algorithms that use the historical data and if need be further data or parameters and the classification, weighting and logic combination thereof. For corresponding decisions within the selection process, it is possible to use threshold-value-based rules, fuzzy-logic-based algorithms and/or algorithms that are based on the analytic hierarchy process (AHP) method, for example.

According to a further advantageous exemplary embodiment of the invention, channel connection data, what are known as external channel connection data, are produced for at least one data transmission process via one of the radio transmission channels in the regional area and outside the mobile unit. The radio transmission channel can then be selected from the group of radio transmission channels by means of the external channel connection data. In addition, the radio transmission channel can be selected particularly in the mobile unit.

A transmission technology within the meaning of the present invention can provide particularly a cellular network, at least one access point and/or at least one ad-hoc radio network. The transmission technology can correspond to a corresponding technological standard for data transmission, for example one of the standards
Global System for Mobile Communications (GSM), GSM2, GSM3 (Universal Mobile Telecommunications System, UMTS), GSM4 (Long Term Evolution, LTE, LTE-A),
Wireless Local Area Network (WLAN) based on the group of IEEE 802.11x standards,
the European Telecommunications Standards Institute Intelligent Transport System standard ETSI ITS G5, or
the Worldwide Interoperability for Microwave Access (WiMAX) standard, and if need be in turn a particular version thereof and standards derived therefrom, or another data transmission standard.

The corresponding radio base station may be a mobile radio base station or a WLAN network router or a WLAN Access Point, for example. The communication system technologies of the antennas may each be designed accordingly.

An antenna can be used exclusively for data transmission on the basis of a particular communication system technology or nonexclusively, the antenna then being jointly used for data transmission on the basis of further communication system technology. By way of example, an antenna in an antenna array or in an antenna arrangement comprising at least two antennas can be used either in the complex for data transmission on the basis of a multiantenna communication system technology, such as LTE technology, or individually for transmission on the basis of a single-antenna technology, such as GSM technology.

The invention can advantageously be used for control-oriented coordination between controllers of different radio transmission channels or communication technologies and/or infrastructure components. A selection method according to the invention for a radio transmission channel allows active resource management and active connection management for the respective radio transmission channels to be performed, particularly by the mobile unit. These may be application-based, in particular. They can be controlled centrally. In addition, a specific cost function can advantageously be used to achieve optimized handling of the available degrees of freedom in a hybrid network and hence an improvement in the functional quality during use thereof. The specific selection of the radio transmission channel also allows the energy efficiency of the mobile unit to be improved, for example by virtue of the reduced transmission power being able to be set for the radio transmission channel or a radio transmission channel having less complex signal processing effort being selected.

The invention particularly also allows connection charges for the data link between the mobile unit and the central unit to be saved if the external data contain a charge parameter that corresponds to the charge tariffs respectively associated with the regional area and/or with the time of day for the respective radio transmission channels. The radio transmission channel can then also be selected by taking account of the charge parameter.

Further exemplary embodiments of the invention are explained in more detail below with reference to figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
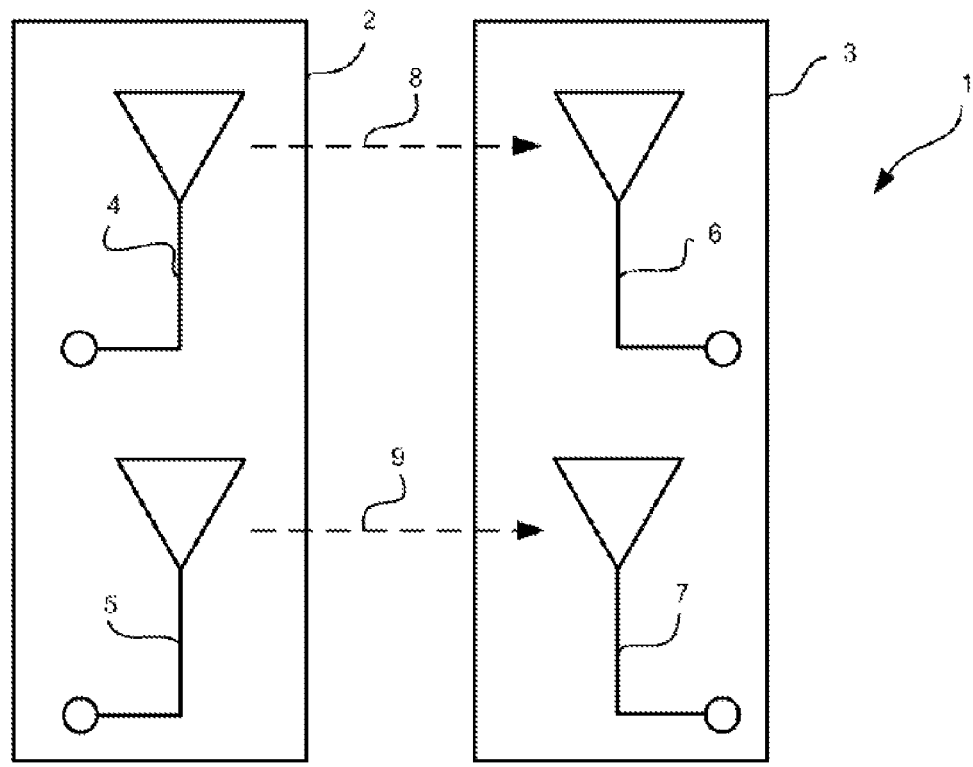
FIG. 1 shows an idealized radio transmission system.

In the multiantenna mobile radio transmission system 1 shown in FIG. 1, communication takes place between a mobile radio base station 2 and a mobile radio transmission unit 3 of a mobile terminal, said mobile radio transmission unit being permanently connected to a motor vehicle and being integrated at least to some extent in an antenna arrangement fitted to the outside of the roof of a motor vehicle, for example in what is known as a roof fin. The mobile terminal may be a mobile radio telephone, a smartphone or another mobile communication device that comprises mobile radio components and/or further network components and particularly has components for setting up an internet connection. The mobile radio base station 2 has two antennas 4, 5 and the mobile radio transmission unit 3 has two antennas 6, 7. The antennas 4, 5, 6 and 7 each have standard electronic transmission and reception components connected to them for the mobile radio transmission. FIG. 1 shows an idealized situation in which communication between mobile radio base station 2 and mobile radio transmission unit 3 involves the transmission of data in each case via precisely two antennas and therefore via precisely two transmission paths 8, 9. In this case, the first transmission path 8 is formed between antennas 4 and 6 and the second transmission path 9 is formed between antennas 5 and 7. Accordingly, data transmission from the mobile radio base station 2 to the mobile radio transmission unit 3 takes place firstly from an antenna 4 to the antenna 6 via the first transmission path 8 in the direction of the arrow and secondly by the second transmission path 9 from antenna 5 to the antenna 7 in the direction of the arrow. In the optimum case shown here, the two transmission paths 8, 9 do not interfere with one another and the respective radio signals do not overlap or interact. As a result, the two transmission paths 8, 9 are totally physically independent of one another. Accordingly, the power from the transmitting antenna 4 is received only by the receiving antenna 6 and the power that is output from the transmitting antenna 5 is received only by the receiving antenna 7, for example. Such a multiantenna radio system, which may also have more than 2×2 antennas, particularly n×m antennas (n, m>=2), therefore allows the transmission of data via multiple physical transmission paths.

The ideal configuration of the transmission paths that is shown in FIG. 1 cannot be achieved completely during real operation of the antenna system under physical influences such as reflection, diffraction and refraction between transmitter and receiver. In this case, the effects of cross coupling, which is shown schematically in FIG. 2, can arise, in particular, which result in lower performance from the transmission system. By way of example, the cross coupling means that radio signals from the antenna 4 are received by antenna 7 via a transmission path 10, which is in turn shown schematically by an arrow. Radio signals from the antenna 5 are received by antenna 6 via a transmission path 11, which is likewise shown by an arrow. Accordingly, in addition to the direct receptions by the antennas 6 and 7 via the transmission paths 8, 9 from antennas 4 and 5, there is cross reception from the respective other transmission antennas 5 and 4 via the transmission paths 11, 10.

Assuming that, both in the optimum transmission scenario and in the real transmission scenario, the same power in total is transmitted via all transmission paths, that is to say that the damping properties are unchanged in total, it becomes clear that evaluation of purely power-based parameters, such as the RSSI (Receive Strength Indicator) parameter, for which the sum of the reception powers at all reception antennas is measured, has only very limited suitability for channel and system rating for handover decisions. In this case, although it is possible to make a statement regarding the loss properties of the respective transmission channel, the physical properties of the channel—which are characterized particularly by diffraction, scatter and reflection influences in the associated transmission paths—are ignored. However, these physical properties can be exploited in a specific manner and used for the handover decisions when multiantenna systems are used, and they then have a high level of influence on the system performance.

Figure 2:
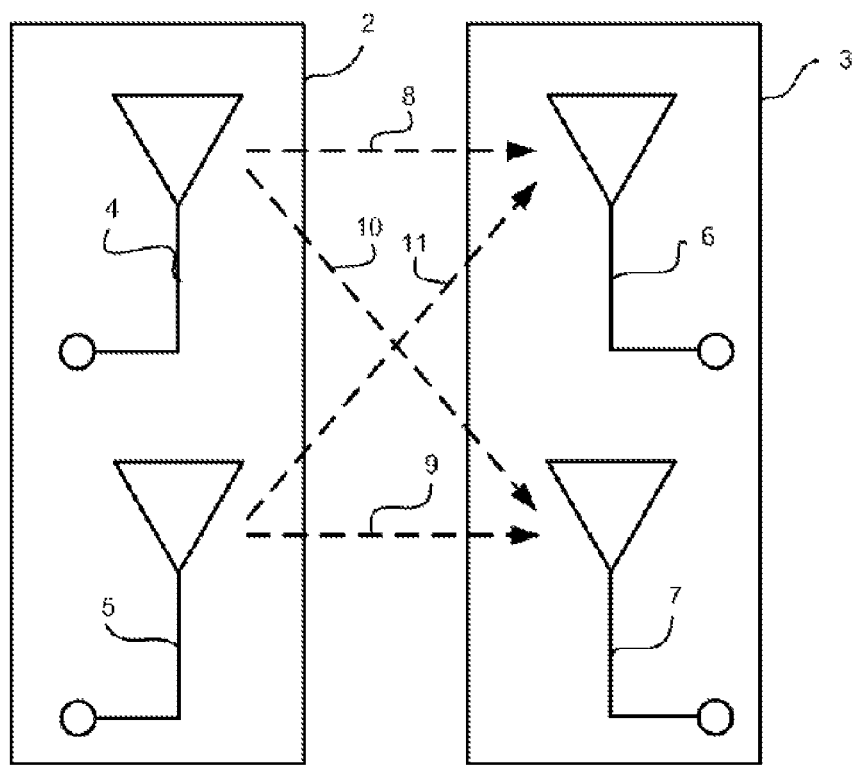
FIG. 2 shows a real radio transmission system.

In the case of the transmission system shown in FIG. 2, a handover decision can be made concerning the antennas between which useful data, for example telephone call data, SMS/MMS data or internet data, are transmitted by the mobile radio base station 2 and the mobile radio transmission unit 3. In this case, the available transmission paths are:

Transmission path P1: Transmission between antenna 4 and antenna 6

Transmission path P2: Transmission between antenna 4 and antenna 7

Transmission path P3: Transmission between antenna 5 and antenna 6

Transmission path P4: Transmission between antenna 5 and antenna 7.

For the decision concerning which transmission channel from these transmission paths is used for transmitting useful data (handover decision), a quality value is determined on a channel-by-channel basis. In order to determine the respective quality value, it is possible to use the transmission rate of the respective channel, for example the useful data transmission rate that arrives at the antenna 6 and is possibly ascertained by means of a decoder connected thereto for a transmission channel based on the transmission paths P1 and P3.

The following further characteristics can be used for determining the quality value: data transmission rate, radio reception power, energy consumption by the receiver, time delays for the data transmission, signal-to-noise ratio, signal termination times, local preference settings, etc.

In order to keep down the evaluation effort for channel coefficients of the channels, the condition number from the respective channel transmission matrix can be used as the primary indicator (key performance indicator, KPI) for determining the respective quality value. This allows fast rating of the performance of the respective transmission link, i.e. channel-by-channel determination of the respective quality value, in order to improve the handover decisions for such multiantenna systems, or in order to be able to make such decisions in optimum fashion, on the basis of the comparison of the respective channel quality values.

The transmission channel decisions can be made not only, as shown in FIG. 2, for spatial or antenna-by-antenna transmission paths but also for respective communication system technologies, such as GSM, UMTS or LTE, which are supported and provided by the mobile radio base station 2 and the mobile radio transmission unit 3. In this case too, a respective quality value is determined for the different transmission channels and, on the basis of the comparison of the respective channel quality values, a decision is made regarding which transmission channel, that is to say which connection technology, is used for transmitting the useful data.

Figure 3:
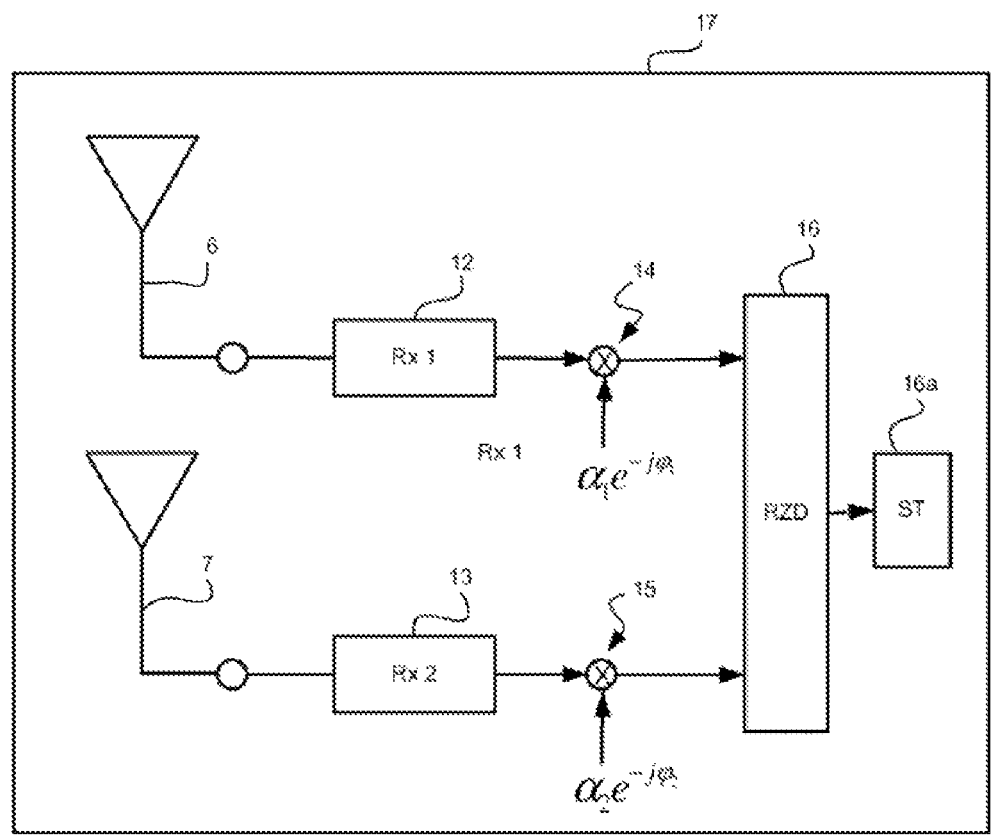
FIG. 3 shows a mobile terminal.

FIG. 3 shows a mobile terminal 17 with the reception-end components, including the antennas 6, 7, that is permanently connected to a motor vehicle. In addition, transmission influences on the received mobile radio signal are shown schematically. The mobile radio signals arriving via antenna 6 are received and processed by the receiver 12 (Receiver Rx 1). In addition, amplitude and phase matching (14) of the received signals is performed in accordance with equation (1):

$$\alpha_1 e^{-j\varphi 1} \qquad \text{(equation 1)}$$

where

α1 is an amplitude matching value based on the multi-antenna input signals, j is the imaginary number and φ1 is a phase matching value based on the multiantenna input signals.

For the mobile radio signals received via antenna 7, a similar situation applies, a receiver 13 (receiver Rx 2) and an amplitude and phase matching section (15) being provided in this case.

The mobile radio signals are then decoded on a transmission-channel-by-transmission-channel basis in a common, complex receiver for decoding signals from the multiantenna mobile radio transmission system 1, what is known as a space/time decoder 16, and the useful data are obtained in the process. These data can then be transmitted to the controller 16a, in which the transmission channel parameters can be formed on the basis of the decoding process or the useful data, the quality value for the respective transmission channel can be formed and the decision in favor of the transmission channel can be made. By way of example, for transmission based on the LTE standard, integration of channel parameters, such as the data transmission rate, and/or over values to produce preamble data for an LTE transmission protocol can be effected using a measuring time of 100 ms and a reception bandwidth of 10 MHz in order to determine the quality value.

Figure 4:
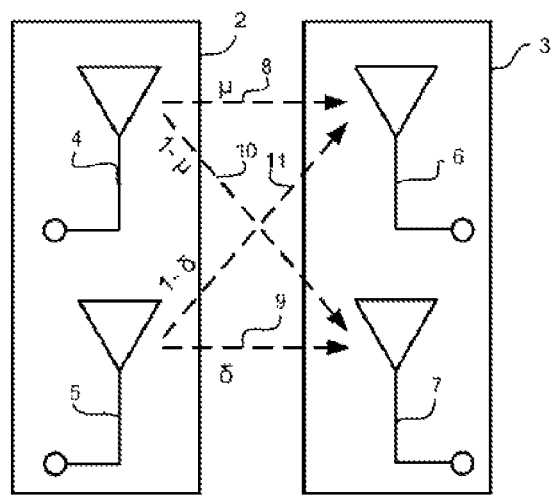
FIG. 4 shows channel capacities of a radio transmission system,
FIG. 5 schematically shows a motor vehicle driving through two regional areas.
Figure 4:
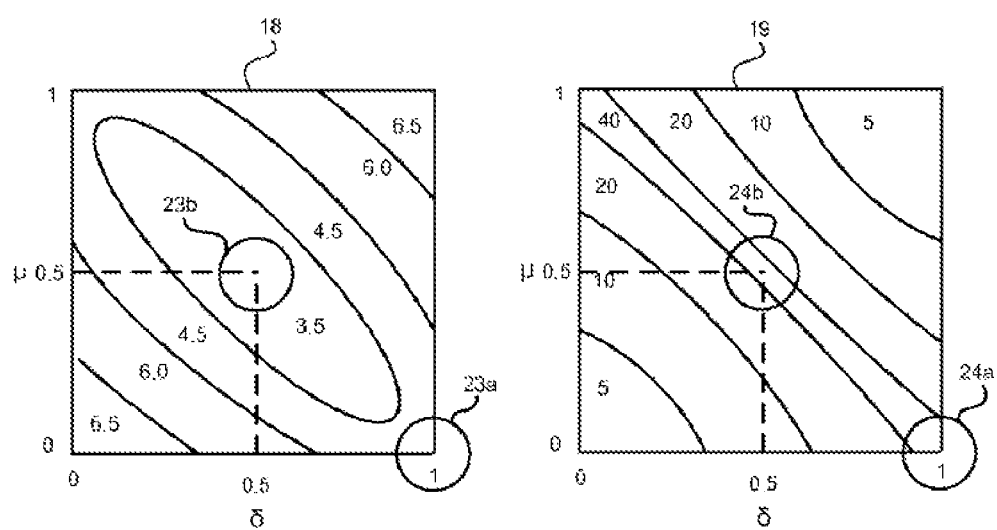

FIG. 4 once again shows the antenna configuration already shown in FIG. 2, the reception power being indicated for the transmission channels, in each case with normalization and on an idealized basis assuming that no power loss occurs, but transmission imbalances can arise. In this case, antenna 6 receives a power μ on transmission path 8, antenna 7 receives a power δ on transmission path 9, antenna 7 receives a power 1-μ on transmission path 10 and antenna 6 receives the power 1-δ on transmission path 11.

When two reference arrangements A and B having transmission matrices $$[H_A] = \begin{bmatrix} 0 & 1 \\ 0 & 1 \end{bmatrix} \text{ und } [H_B] = \begin{bmatrix} 0.5 & 0.5 \\ 0.5 & 0.5 \end{bmatrix}$$

are considered, a singular-value breakdown respectively results in the eigenvalues $$\vec{\sigma_A} = \begin{pmatrix} 1.41 \\ 0 \end{pmatrix} \text{ und } \vec{\sigma_B} = \begin{pmatrix} 1 \\ 0 \end{pmatrix}.$$

Although the same condition number is achieved for both reference arrangements, measurement of the channel matrix [HB] leads to lower spectral efficiency than the channel matrix [HA]. This is shown in the two graphics 18, 19 in FIG. 4 on the basis of the respective transmission imbalance (δ, μ), graphic 19 illustrating the condition number κ[H]/dB and graphic 18 the spectral efficiency $$C \Big/ \frac{\text{MBit}}{s\,\text{Hz}}.$$

Circle 24a in graphic 19 indicates the situation of the reference arrangement A and circle 24b indicates the situation of the reference arrangement B. For both situations, an approximately identical condition number of approximately 40 dB is obtained. The spectral efficiencies, on the other hand, differ substantially. For reference situation A, it is in the region of approximately 4.5 Mbit/sHz (circle 23a), whereas for reference situation B it is only in the region of 3.5 Mbit/sHz (circle 23b).

The analysis of all four parameters of 2×2 transmission matrices [HA], [HB] for determining a quality value for the respective transmission channels allows the transmission properties to be rated very well in order to attain a high transmission data rate. If only power-based analysis were performed at the receiver end, on the other hand, then both reference situations A, B would be assessed as equally suited, even though reference situation A is much better suited to attaining a high data rate.

Figure 5:
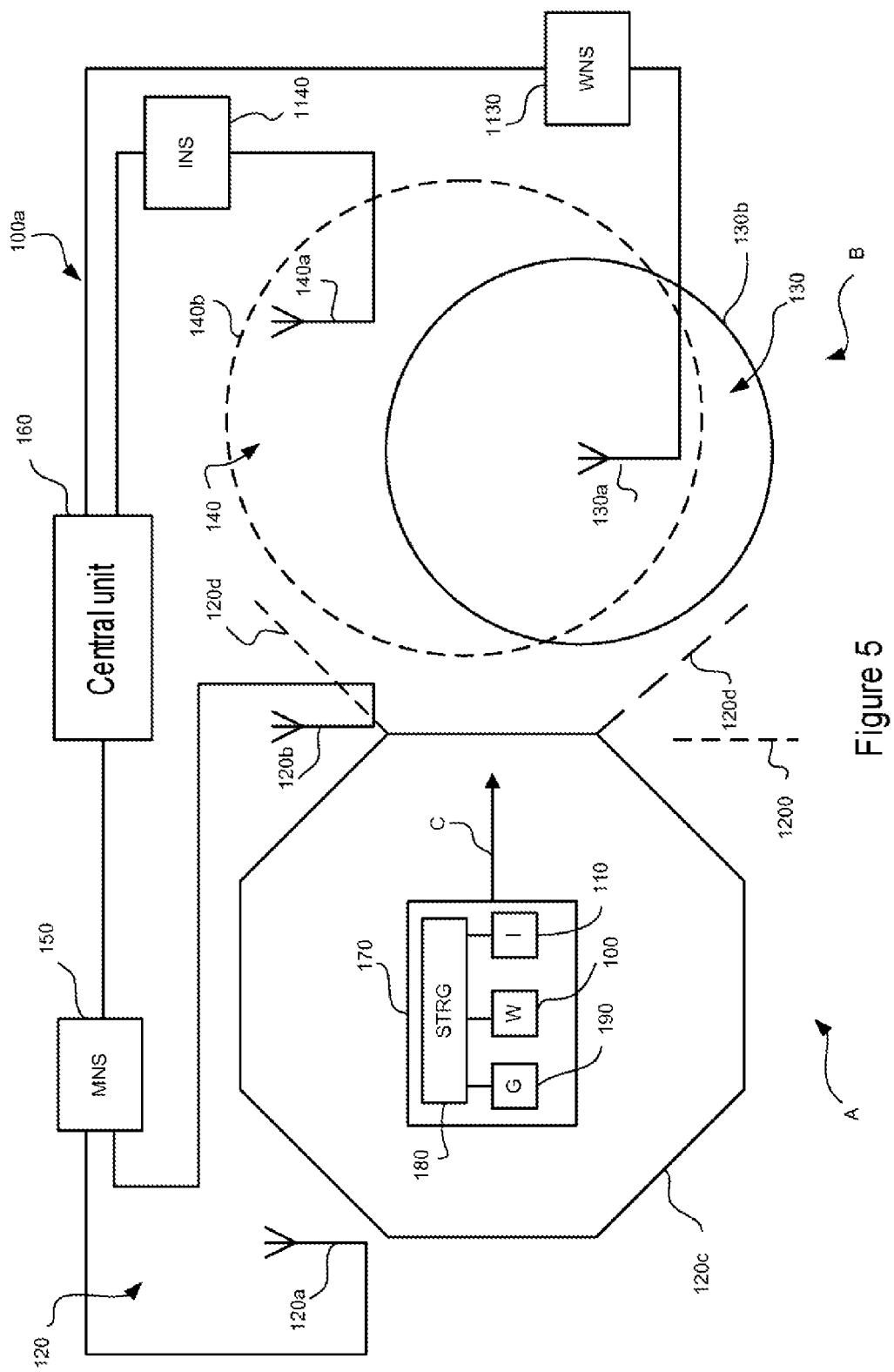

FIG. 5 shows a hybrid network infrastructure 100a, which in this example comprises a GSM 3G mobile radio network 120, a WLAN network 130 and an ETSI ITS G5 mobile radio network 140. The network infrastructure 100a can also comprise other transmission technologies. There may also be a corresponding second network infrastructure provided, which is entirely or partly independent of the first network infrastructure and is operated by a different network operator, for example. The two network infrastructures can, if need be, use entirely or partly the same components and/or have the same transmission technologies, for example jointly use one base station, but may be set up differently in terms of control engineering. The GSM 3G mobile radio network 120 extends comprehensively over two regional areas A, B, two adjoining mobile radio cells 120c, 120d being indicated symbolically in FIG. 1 and the indicated dividing line 1200 separating the regional areas A, B. Regional areas can also be referred to as territories or as zones or represent these or be parts of these. They may be categorized or delimited from one another arbitrarily, in principle, within a map. Regional areas can, but do not have to, adjoin one another seamlessly. They can overlap, for example. Boundaries between regional areas can be defined by boundaries between radio network cells in a mobile radio network, for example.

For the GSM 3G mobile radio network 120 of the network infrastructure 100a, two local units in the form of mobile radio base stations 120a and 120b that each have at least one mobile radio antenna are shown in the regional area A, and a mobile radio network controller 150 that is operated by the network operator of the mobile radio network and that is used to communicate the relevant mobile radio data, inter alia. The mobile radio network controller 150 is in turn connected to a central unit 160 that can also interchange data with the other two networks 130 (WLAN), 140 (ETSI ITS 5). This connection may be at least to some extent wired. The WLAN network 130 additionally contains a local unit, provided in the regional area B, in the form of a WLAN base station 130*a*, which comprises a WLAN antenna, and a WLAN network controller 1130. The ETSI ITS G5 mobile radio network 140 accordingly contains a local unit in the form of an ETSI ITS 5 base station 140*a*, which comprises at least one ETSI ITS 5 antenna, and an ETSI ITS 5 network controller 1140. The WLAN network 130 comprises, in the regional area B, a WLAN radio cell 130*b* within which wireless communication with a mobile unit on the basis of WLAN transmission technology is possible. The ETSI ITS G5 mobile radio network 140 comprises, in the regional area B, an ITS radio cell 140, within which wireless communication with a mobile unit on the basis of ETSI ITS G5 transmission technology is possible.

In addition, FIG. 5 schematically shows a motor vehicle 170, with particularly the dimensions thereof not being to scale in comparison with the size of the mobile radio cell 120*c*. In the present example, the vehicle 170 comprises a plurality of components for radio-based data transmissions. A communication controller 180 allows selection of the radio transmission technology for wireless communication on the basis of the three radio transmission technologies cited above. The data transmission is then effected via a GSM communication module 190 that supports GSM3 transmission technology, via a WLAN communication module 100 that supports WLAN transmission technology or via a communication module 110 that supports ETSI ITS G5 transmission technology. To this end, the communication controller 180 is used to respectively select which of the modules 100, 110, 190, i.e. which radio transmission channel, is used to set up a data link between the vehicle 170 and the central unit 160. The selection (vertical handover) is made afresh particularly when the motor vehicle 170 has reached the prescribed regional area B from the prescribed regional area A as a result of its motion in direction C.

Figure 6:
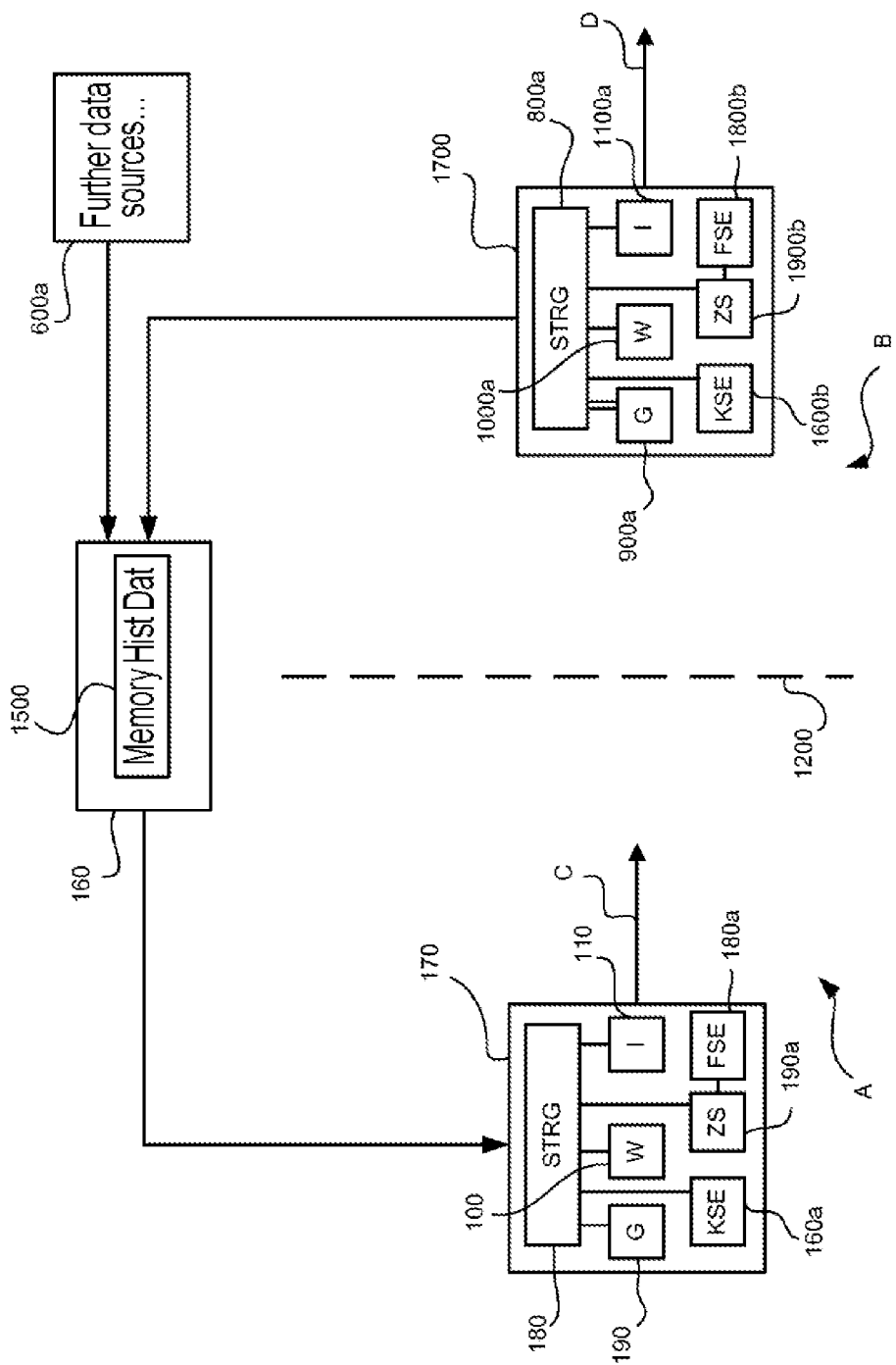
FIG. 6 shows a data transmission for historical data.

FIG. 6 shows the motor vehicle 170 in the regional area A once again, wherein in this case, in addition to the radio transmission modules 100, 110, 180 and 190, sensors 160*a* are also shown that can be used to capture radio transmission parameters from the respective radio transmission channels, such as the respective signal strength. The measured values of radio transmission parameters can then be used for selection or vertical handover. In addition, the motor vehicle 170 contains a central vehicle controller 190*a* that is connected to the communication controller 180 for controlling the radio transmission for the purpose of interchanging data. The central vehicle controller 190*a* receives measurement data from vehicle-internal sensors 180*a*, such as speed sensors, position sensors, acceleration sensors, etc. These data captured locally in the mobile unit or in the motor vehicle 170 can be used in the communication controller 180 for selecting the radio transmission channel. The communication controller 180 may additionally store historical, geo-referenced data that have been captured by means of the sensors in the motor vehicle 170 during earlier trips through the regional area A. These data can also be used for selecting the radio transmission channel in the regional area A. In addition, the controller 180 can use a currently existing radio link to retrieve, from a data memory 1500 of the central unit 160, historical data that are used to control the selection of the radio transmission channel. These historical data may likewise be geo-referenced for the regional area A on the basis of position coordinates. The central unit 160 can additionally retrieve data from further sources 600*a* and provide them for the communication controller 180 or send them to this controller, which it can then use to select the radio transmission channel. By way of example, a further data source 600*a* can be provided by a network operator of a mobile radio network and is used by the network operator to provide up-to-date information about faults. Up-to-date or historical data of this kind from the network operators may be time-based and/or geo-referenced.

In FIG. 6, the local regional area B contains a vehicle 1700 that likewise has the components described above in relation to vehicle 170. However, the vehicle 1700 is just about to leave the regional area B in its direction of travel D. The communication controller 800*a* of the mobile unit or of the vehicle 1700 transmits data pertaining to radio transmission channels, which data are captured in the vehicle 1700 during its stay in the regional area B, to the central unit 160, which stores them as historical data, a time stamp for receipt of the data being able to be allocated in order to take account of the currentness of said data when they are later forwarded to other vehicles. The captured data may be measured values from the radio sensors 1600*b* and/or from the vehicle sensors 1800*b*, that may also be fault reports or error messages from the respective radio transmission modules 900*a*, 1000*a*, 1100*a* and/or for the communication controller 800*a* or other historical data or experience maps that are stored in the communication controller 800*a*, having already been captured earlier. The vehicle 1700 has a central controller 1900*b* that corresponds functionally to the controller 190*a* of the vehicle 170 and processes the corresponding data.

Figure 7:
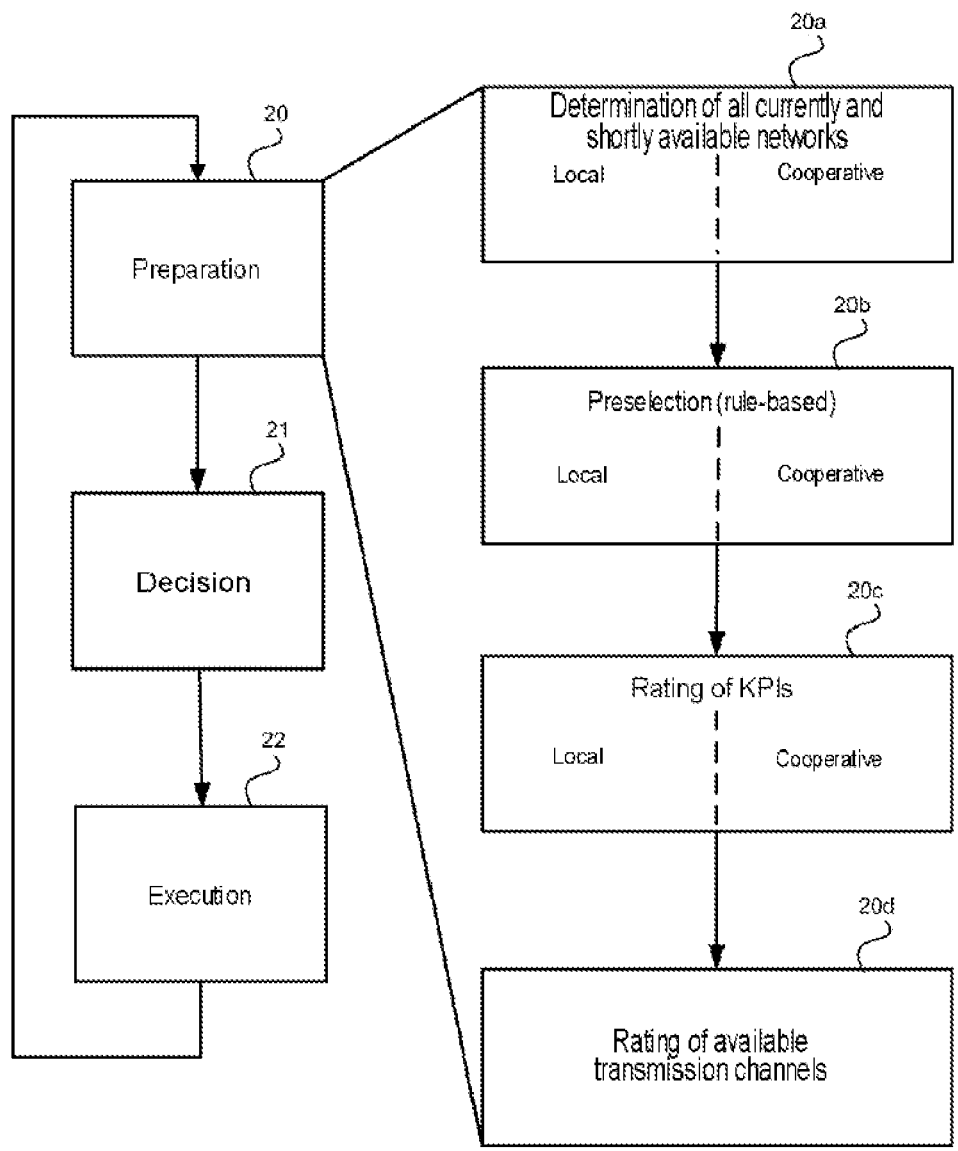
FIG. 7 shows a flowchart for a transmission channel decision.

FIG. 7 shows a flowchart for the selection of a radio transmission channel, also called transmission channel selection. In a first phase 20, the decision is prepared, in a second phase 21, the decision regarding which transmission channel is selected is made on the basis of information from step 20 and using prescribed rules, and in a first phase 22, the receiver is adjusted as appropriate in order to prompt the data transmission using the selected transmission channel. Phases 20, 21, 22 for transmission channel selection are rerun at regular intervals of time in order to allow data transmission with the least possible interruption at the highest possible data transmission rate, even when the mobile terminal is moving. The phases can also be run using position information, a fresh run taking place when prescribed regional areas are reached. This can additionally involve the use of a road map and up-to-date sensor data from a vehicle, such as its speed, steering lock angle, etc., to forecast when the mobile terminal or vehicle is within a prescribed area. In this case, it is particularly also possible to use data from a journey route that is programmed in a navigation system and that the vehicle is on. On the basis of this information and further information described previously or subsequently, for example pertaining to available radio transmission channels, it is then already possible proactively at least to provide decision criteria and, in particular, to make prior decisions already or to make the firm decision to select a radio transmission channel in a regional area that the mobile unit or the vehicle does not reach until a later time. This means that on arrival in the area it is possible for any handover process to be performed quickly, efficiently and without faults, particularly without interruption.

Phase 20 is divided into four steps. In step 20*a*, criteria can be determined in each case either at the receiver end locally on the basis of values ascertained directly by means of measurement and/or scanned, or cooperatively. For cooperative determination, data about networks that are available at present and/or soon can also be determined from other data sources, such as an availability map provided by a central data service or an experience map created at the receiver end over the course of time, each of which are based on a multiplicity of empirically ascertained data. In step 20b, rule-based preselection of transmission channels takes place, this likewise being able to be effected locally, cooperatively or both locally and cooperatively in combination. Locally, a transmission channel can be excluded on the basis of a lower speed limit for the data transmission or on the basis of a lower radio power limit, for example. Cooperatively, a central data service can advise against use of a network service, for example, and therefore a transmission channel that uses this network service can be excluded. By way of example, the network operator can provide a piece of information stating that a particular network or a particular radio transmission channel is busy in the relevant regional area. On the basis of this information, the relevant radio transmission channel can be excluded from the selection.

In step 20c, the prescribed, decision-relevant key performance indicators (KPI) are rated and a quality value is derived therefrom for each transmission channel. This can involve locally different performance values, such as data transmission rate, radio strength, spectral efficiency, energy consumption by the receiver, data transmission time delays, a signal-to-noise ratio, signal terminations, local preference settings, etc., being rated using rating rules on a channel-by-channel basis. To this end, it is also possible to use preamble data from transmission protocol data, for example, and/or to integrate measured values with respect to time. The performance indicators may also comprise further information, such as tariff information or preference information, for the respective radio transmission channels. Local rating and/or cooperative rating can also take place in step 20c. In step 20d, the available radio transmission channels are rated, with an order also being able to be formed on the basis of a prescribed rule.

Figure 8:
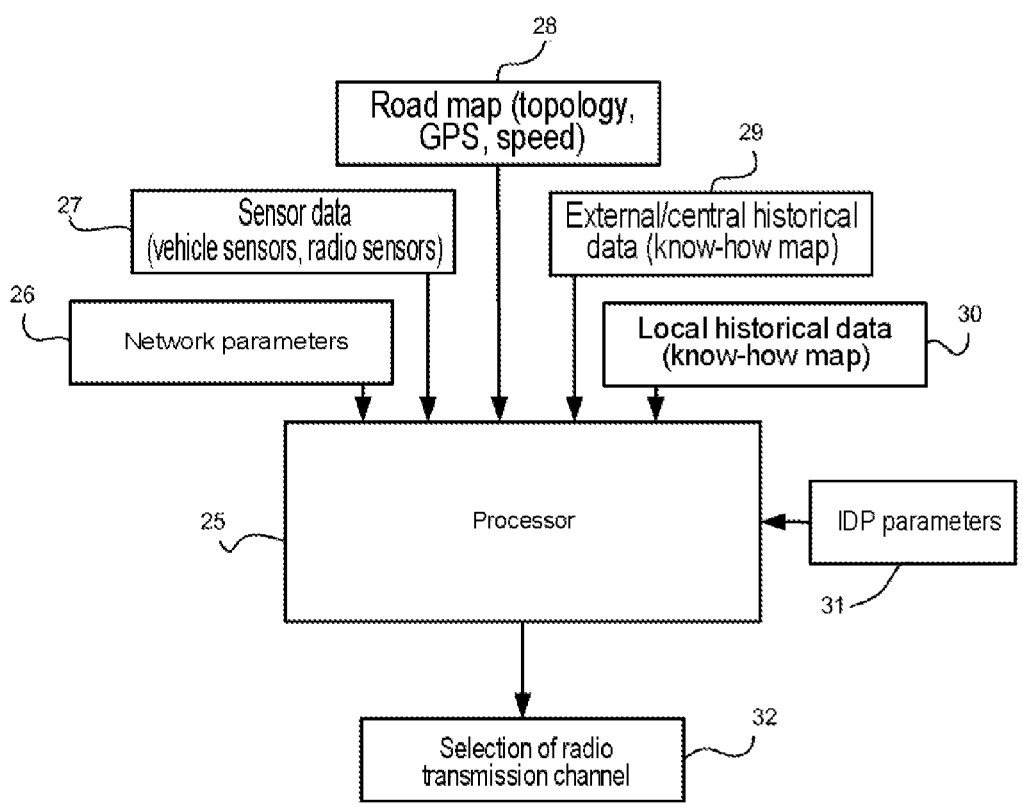
FIG. 8 shows a structure diagram for the selection of a radio transmission channel.

FIG. 8 illustrates a structure diagram for a process for selecting a radio transmission channel from a group of different radio transmission channels in a mobile unit, which process can be used for the process variants described above. To this end, the mobile unit, for example the communication controller 180 shown in FIG. 1, contains a processor 25 that executes an appropriate computer program prompting the selection method. In order to control the selection method, various data are additionally loaded into the processor 25. In particular, control parameters 31 are loaded into the processor 25, what are known as intelligent data planning parameters (IDP parameters), which apply a particular instance of various selection algorithms supported by the computer program for the selection method, for example. In addition, appropriate network parameters 26, provided particularly by the central unit, the local units and/or the mobile unit, are loaded into the processor 25 for the individual radio transmission channels that are available in the group. In addition, sensor data 27 that are captured particularly in the mobile unit are loaded into the processor 25. These may be data from radio-specific sensors or data from vehicle-specific sensors, for example. In addition, road map data 28 can be loaded into the processor 25, for example in respect of the topology of the territory that the mobile unit is currently in or that it will reach on the basis of a journey route loaded in a navigation system, and appropriate sensor data pertaining to the current whereabouts, such as global positioning system (GPS) data or data derived therefrom, such as speed data. In addition, the processor 25 can have external data 29 loaded into it that are provided by and retrieved from a data source such as a central unit that is external to the mobile unit.

Both the external data and the local data may be historical data, and, particularly in the case of earlier radio links, they have been captured and then stored in the same regional area that the mobile unit is currently in for the same radio transmission channels. Alternatively, the historical data may be based on other constraints, for example on a time statement, according to which, by way of example, a particular radio transmission channel is very busy in a particular period and then has relatively poor availability. A corresponding data collection that stores historical data for a multiplicity of regional areas or territories can be provided as an experience map. Corresponding historical data that are stored in the mobile unit and have been formed particularly from measured values that have been captured by sensors of the mobile unit can likewise be loaded into the processor 25 as local historical data 30.

When the computer program executed in the processor 25 has processed the respective loaded data, at least one data record or a control value 32 is output that is used in the mobile unit to select a radio transmission channel from the group of available radio transmission channels, particularly by changing over the mobile unit to the respective communication module of the respective radio transmission channel.

The following categories of information can be used for selecting the radio transmission channel, in each case individually or in combination:
  traffic information
  network utilization
  availability map
  experience map and/or
  road map.

The respective information can be geo-referenced, so that a complex, multilayer information landscape or map landscape can be produced overall. The respective information can comprise up-to-date data and/or historical data.

The devices and system components described are controlled particularly by means of computer programs and to this end can additionally have further, inherently known elements of computers and digital control devices, such as a microprocessor, volatile and nonvolatile memories, interfaces, etc. The invention can therefore also be implemented entirely or partly in the form of a computer program product that, when loaded and executed on a computer, entirely or partly prompts a sequence according to the invention. By way of example, it can be provided in the form of an electronically readable data storage medium.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmission channel selection in a multiantenna network radio link that transmits data via radio signals between a radio base station and a mobile terminal, wherein the radio base station includes at least two base station antennas, and the mobile terminal includes at least two terminal antennas, wherein the at least two base station antennas and the at least two terminal antennas form: a plurality of transmission paths for the multiantenna network radio link, and at least two transmission channels for transmitting the data, wherein each transmission channel uses one or more of the transmission paths in accordance with a channel matrix, and wherein the mobile terminal further includes at least one decoder that decodes the radio signals received from at least one of the terminal antennas to obtain the data, the method comprising:

transmitting radio signals including first data to the mobile terminal from the base station via each of the transmission paths using at least two different communication system technologies;

supplying the transmitted radio signals to the decoder on a transmission-channel-by-transmission-channel basis, for each of the transmission channels, so as to decode the mobile radio signals and thereby obtain the first data on the transmission-channel-by-transmission-channel basis, for each of the transmission channels;

determining at least one channel-specific quality value from the decoded first data on the transmission-channel-by-transmission-channel basis, the at least one channel-specific quality value reflecting physical properties of the respective transmission channel that are characterized by diffusion, reflection and/or refraction influences on the data transmission via the respective transmission channel, wherein the channel-specific quality values are eigenvalues of a transmission matrix reflecting each of the transmission paths;

receiving, by the mobile terminal, control data that are produced outside the mobile unit; and selecting a transmission channel from among the at least two transmission channels for a subsequent transmission of radio signals including second data to the mobile terminal, the selection being based on both the control data and a comparison of the channel-specific quality values of the transmission channels.

2. The method as claimed in claim 1, further comprising: estimating coefficients of the channel matrix on the basis of the decoded first data.

3. The method as claimed in claim 1, wherein at least one base station antenna and at least one terminal antenna transmit data on the basis of the two different communication system technologies.

4. The method as claimed in claim 1, wherein determining the at least one channel-specific quality value comprises determining at least one of: a data transmission rate, a condition number of the respective transmission channel ascertained based on the channel matrix, and a spectral efficiency of the respective transmission channel.

5. The method as claimed in claim 1, wherein determining the at least one channel-specific quality value comprises integrating over a prescribed reception bandwidth and over at least one portion of a preamble of a transmission protocol that is used for the radio link.

6. The method as claimed in claim 1, wherein the channel matrix is formed for a plurality of available transmission paths.

7. The method as claimed in claim 1, wherein the network radio link is one of a mobile radio link and a WLAN connection.

8. The method as claimed in claim 1, wherein the radio base station is a static station and the mobile terminal is permanently connected to a motor vehicle.

9. The method as claimed in claim 8, wherein the motor vehicle has a bodywork and the antennas of the mobile terminal are mounted on the outside of the bodywork.

10. A method for selecting a radio transmission channel from a group of radio transmission channels, each corresponding to different transmission technologies using different infrastructure components, in order to set up data transmission links between a mobile unit and a central unit, wherein the mobile unit has at least two radio units, each configured for data transmission using one of a first and a second radio transmission channel, the method comprising:

connecting the central unit to a first local unit that is arranged in a regional area, the first local unit useable to set up a first data transmission link to the mobile unit via the first radio transmission channel corresponding to a first transmission technology via a first infrastructure component, connecting the central unit to a second local unit that is arranged in the regional area, the second local unit usable to set up a second data transmission link to the mobile unit via the second radio transmission channel corresponding to a second transmission technology, different from the first transmission technology, via a second infrastructure component, and selecting the radio transmission channel from among the first and second radio transmission channels based on control data that are produced and stored outside the mobile unit and a comparison of respective channel-specific quality values for each of the respective radio transmission channels, the channel-specific quality values reflecting physical properties of the respective radio transmission channels that are characterized by diffusion, reflection and/or refraction influences on data transmission via the respective radio transmission channels, wherein the channel-specific quality values are eigenvalues of a transmission matrix reflecting each transmission path formed between the mobile unit and the central unit.

11. The method as claimed in claim 10, wherein the control data are at least one of produced, provided and transmitted to the mobile unit by the central unit or at least one of the local units.

12. The method as claimed in claim 10, wherein the selection is made in the mobile unit.

13. The method as claimed in claim 10, wherein the selection of the radio transmission channel from the group of radio transmission channels involves the use of data pertaining to at least one earlier radio link, as historical data, for at least one of the radio transmission channels in the regional area.

14. The method as claimed in claim 13, wherein the historical data are at least one of captured, provided and stored in at least one of the mobile unit, in the local unit, in the central unit and in a further data source.

15. The method as claimed in claim 13, wherein the historical data are geodata-referenced, wherein the selection is made on the basis of (i) at least one of position finding for the mobile unit and the geodata-referenced historical data, and (ii) the historical data being time-referenced, with the selection being made on the basis of timing and the time-referenced historical data.

16. The method as claimed in claim 15, wherein the position finding for the mobile unit is performed based on a navigation system, wherein a route stored in the navigation system, along which the mobile unit moves, and the geodata-referenced historical data are used to precondition the respective selection process for the radio transmission channel for road sections along the route.

17. The method as claimed in one of claim 10, wherein the selection of the radio transmission channel comprises an interaction of at least one of a controller provided in the mobile unit, a controller provided in the central unit, and a controller provided in one of the local units.

18. The method as claimed in claim 10, wherein the radio transmission channel is selected from the group of radio transmission channels based on control data that are at least one of produced and stored outside the mobile unit.

19. The method as claimed in claim 10, wherein the mobile unit is a vehicle.

20. The method as claimed in claim 10, wherein the mobile unit contains a first controller for controlling the radio link of the first transmission technology and the first infrastructure component, and a second controller for controlling the radio link of the second transmission technology and the second infrastructure component.

21. The method as claimed in claim 10, wherein at least one controller of the mobile unit contains at least one sensor that is used to capture measured values that are definitive for the channel-specific quality values of the radio transmission, and wherein the at least one controller is configure to use the measured values to select the radio transmission link.

22. The method as claimed in claim 10, wherein the radio transmission channel is additionally selected on the basis of at least one computer-controlled application that is executed on a processor that is connected to the mobile unit.

23. The method as claimed in claim 10, wherein the transmission technologies of the radio transmission channels are each selected from the following group of standardized technologies: GSM, GSM2, GSM3, GSM4, LTE, LTE-A, UMTS, WLAN, WiMAX, ETSI ITS G5.

24. A data transmission system for selecting a radio transmission channel from a group of radio transmission channels, comprising:
   a mobile unit comprising at least two radio units, each configured for data transmission using one of a first and a second radio transmission channel; and
   a central unit configured to:
      connect to a first local unit that is arranged in a regional area, the first local unit useable to set up a first data transmission link to the mobile unit via the first radio transmission channel corresponding to a first transmission technology via a first infrastructure component,
      connect to a second local unit that is arranged in the regional area, the second local unit usable to set up a second data transmission link to the mobile unit via the second radio transmission channel corresponding to a second transmission technology, different from the first transmission technology, via a second infrastructure component, wherein the first and second radio transmission channels correspond to different transmission technologies using different infrastructure components to set up the respective data transmission links,
   wherein the mobile unit is configured select the radio transmission channel from among the first and second radio transmission channels based on control data that are produced and stored outside the mobile unit and a comparison of respective channel-specific quality values for each of the respective radio transmission channels, the channel-specific quality values reflecting physical properties of the respective radio transmission channels that are characterized by diffusion, reflection and/or refraction influences on data transmission via the respective radio transmission channels, wherein the channel-specific quality values are eigenvalues of a transmission matrix reflecting each transmission path formed between the mobile unit and the central unit.

25. An apparatus configured to select a radio transmission channel from a group of radio transmission channels, which each correspond to at least one of different transmission technologies and use different infrastructure components, in order to set up a data link between a mobile unit and a central unit of the data transmission system, wherein the apparatus comprises:
   the central unit, connected to a first local unit that is arranged in a regional area and that is used to set up a data transmission link to the mobile unit by means of a first radio transmission channel that corresponds to a first transmission technology from the at least one of different transmission technologies and uses a first infrastructure component,
   wherein the central unit is connected to a second local unit that is arranged in the regional area and that is used to set up a connection to the mobile unit using a second radio transmission channel that corresponds to a second transmission technology, different from the first transmission technology, from the at least one of the different transmission technologies and uses a second infrastructure component,
   wherein the mobile unit has at least two radio units that are each designed for data transmission using one of the two radio transmission channels, and
   wherein the radio transmission channel is selected from the group of radio transmission channels based on control data that are produced and stored outside the mobile unit and a comparison of respective channel-specific quality values for each of the respective radio transmission channels, the channel-specific quality values reflecting physical properties of the respective radio transmission channels that are characterized by diffusion, reflection and/or refraction influences on data transmission via the respective radio transmission channels, wherein the channel-specific quality values are eigenvalues of a transmission matrix reflecting each transmission path formed between the mobile unit and the central unit.

* * * * *